US012626498B2

(12) United States Patent
Plachetka et al.

(10) Patent No.: US 12,626,498 B2
(45) Date of Patent: May 12, 2026

(54) NETWORK ARCHITECTURE FOR A THREE-DIMENSIONAL OBJECT DETECTION IN A POINT CLOUD, METHOD AND VEHICLE

(71) Applicant: Volkswagen Aktiengesellschaft, Wolfsburg (DE)

(72) Inventors: Christopher Plachetka, Velpke (DE); Tim Fingscheidt, Braunschweig (DE); Benjamin Sertolli, Wilhermsdorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 340 days.

(21) Appl. No.: 18/467,415

(22) Filed: Sep. 14, 2023

(65) Prior Publication Data

US 2024/0119720 A1     Apr. 11, 2024

(30) Foreign Application Priority Data

Oct. 6, 2022    (EP) .................................... 22200113

(51) Int. Cl.
*G06V 10/82*         (2022.01)
*G06V 20/58*         (2022.01)

(52) U.S. Cl.
CPC ............ *G06V 10/82* (2022.01); *G06V 20/582* (2022.01)

(58) Field of Classification Search
CPC ............................. G06V 10/82; G06V 20/582
See application file for complete search history.

(56) References Cited

U.S. PATENT DOCUMENTS

| | | | |
|---|---|---|---|
| 12,525,031 B2 * | 1/2026 | Smolyanskiy | ....... G06V 20/584 |
| 2019/0113925 A1 | 4/2019 | Sim | |
| 2020/0098135 A1 | 3/2020 | Ganjineh et al. | |
| 2020/0133304 A1 | 4/2020 | Hasberg et al. | |
| 2020/0193195 A1 * | 6/2020 | Doria | ........................ G06T 7/11 |
| 2020/0292331 A1 | 9/2020 | Rabel et al. | |
| 2020/0355513 A1 | 11/2020 | Ma et al. | |
| 2021/0063578 A1 * | 3/2021 | Wekel | ................... G01S 17/894 |
| 2021/0150720 A1 * | 5/2021 | Kumar | ................... G01S 17/89 |
| 2021/0287037 A1 * | 9/2021 | Chen | ......................... G06T 7/73 |

(Continued)

FOREIGN PATENT DOCUMENTS

| | | |
|---|---|---|
| WO | 2017180382 A1 | 10/2017 |
| WO | 2019152049 A1 | 8/2019 |
| WO | 2022069088 A1 | 4/2022 |

OTHER PUBLICATIONS

Lang, Alex H., et al. "Pointpillars: Fast encoders for object detection from point clouds." Proceedings of the IEEE/CVF conference on computer vision and pattern recognition. 2019. (Year: 2019).*

(Continued)

*Primary Examiner* — Utpal D Shah
(74) *Attorney, Agent, or Firm* — Peter Zura; LOZA & LOZA, LLP

(57) ABSTRACT

A network architecture for a three-dimensional object detection in a point cloud to a method and to vehicle. The network architecture for a three-dimensional object detection in a point cloud may include an encoder, a backbone, and a head, wherein the backbone and/or the head may include a three-dimensional convolution component for processing three-dimensional data of the point cloud within a three-dimensional voxel grid.

20 Claims, 5 Drawing Sheets

(56) References Cited

U.S. PATENT DOCUMENTS

| | | | | |
|---|---|---|---|---|
| 2021/0342620 | A1* | 11/2021 | Miura | ........................ G06T 7/70 |
| 2022/0415059 | A1* | 12/2022 | Smolyanskiy | ..... B60W 60/0011 |

OTHER PUBLICATIONS

Priority EP Appln. No. 22200113.3. Extended EP Search Report (Mar. 24, 2023).
Deng et al. "Voxel R-CNN: Towards High Performance Voxel-based 3D Object Detection." 35th AAAI Conference on Artificial Intelligence, pp. 1201-1209 (AAAI 23) (2021).
Ye at al. "LidarMultiNet: Towards a Unified Multi-task Network for LiDAR Perception." 37th AAAI Conference on Artificial Intelligence, pp. 3231-3240 (AAAI 23) (2023).
Platchetka et al. "DNN-Based Recognition of Pole-Like Objects in LiDAR Point Clouds." 2021 IEEE International Intelligent Transportation Systems Conference (ITSC), pp. 2889-2896 Indianapolis, IN, USA (2021).

* cited by examiner

NETWORK ARCHITECTURE FOR A THREE-DIMENSIONAL OBJECT DETECTION IN A POINT CLOUD, METHOD AND VEHICLE

RELATED APPLICATIONS

The present application claims priority to European Patent Application No. 22200113.3 to Plachetka et al., filed Oct. 6, 2022, titled "Network Architecture For A Three-Dimensional Object Detection In A Point Cloud, Method And Vehicle," the contents of which is incorporated by reference in its entirety herein.

TECHNICAL FIELD

The present disclosure relates to a network architecture for detecting vertically stacked objects in a vehicle environment, and to related methods and a vehicle incorporating the network architecture.

BACKGROUND

Deep neural network architectures for object detection in point clouds (such as LiDAR or RADAR point clouds) published to date lack the capability to detect vertically stacked objects, as the current technologies focus on the movable parts of the environment for automated vehicles, where single objects are placed on the ground plane only.

High-definition (HD) maps are a vital component for an automated vehicle and are suitable for numerous tasks of autonomous and semi-autonomous driving. In the field of automated driving, however, to generate HD maps, to detect map deviations onboard while driving, or to generate an environment model on-the-fly without map, the detection of vertically stacked objects such as traffic signs or lights (stacked with signs) is necessary. Also, such vertically stacked objects in a three-dimensional space may occur also in other technology fields, e.g., in physics.

BRIEF SUMMARY

Aspects of the present disclosure are directed to improving 3D object detection. In particular, there may be a need to detect vertically stacked objects in point clouds, for instance for, but not limited to, a vehicle environment.

Accordingly, a network architecture, a method and a vehicle are disclosed according to the subject-matter of the independent claims. Further exemplary embodiments and improvements are provided by the subject-matter of the dependent claims.

In some examples, a network architecture is disclosed for a three-dimensional object detection in a point cloud, and may include an encoder, a backbone, and a head, wherein the backbone and/or the head comprises a three-dimensional convolution component for processing three-dimensional data of the point cloud within a three-dimensional voxel grid.

As used herein, "objects" in this context may be understood as real-world objects. The term "ground truth objects" refers to objects originating from the dataset used to train and test the network, assumed to be a ground truth without annotation errors. The term "ground truth distribution (GT)" may be understood as a distribution of a parameter (e.g., pole diameter) obtained from the ground truth dataset.

Further the term "bounding shape parameters" may be understood as e.g., height, width, and orientation of a bounding rectangle.

The network architecture may preferably be a deep neural network architecture.

In some examples, a network architecture is disclosed for detecting vertically stacked objects in a vehicle environment, comprising an encoder, a backbone and a head, wherein the backbone and/or the head comprises a convolution component that is adapted to perform a convolution within a three-dimensional voxel grid. Some aspects of the present disclosure are directed to the detection of traffic signs as vertically stacked objects. However, the network architecture is not limited to these specific objects. All objects having a vertical dimension (being a three-dimensional object) may be applicable as detected objects in point clouds.

In some examples, a method is disclosed for detecting three-dimensional objects in a point cloud, comprising providing an encoder, providing a backbone, providing a head, and performing in the backbone and/or in the head a three-dimensional convolution by processing three-dimensional data of the point cloud within a three-dimensional voxel grid.

In some examples, a vehicle is disclosed, comprising the network architecture according to the present disclosure or its exemplary embodiments, and at least one LiDAR-sensor and/or one or more RADAR sensors, wherein the sensor is adapted for providing data for the point cloud.

In some examples, the network may be implemented in a vehicle in the automotive domain. However, regarding the generation of HD maps (or other technology fields), the network may be implemented in a general processing unit (GPU)—such a GPU cluster generating traffic signs (or other vertically stacked objects) for large amounts of data—rather than single laser scans originating from onboard data, for instance.

In some examples, the point cloud may be provided by one or more sensors, such as LiDAR-sensor or a plurality of LiDAR-sensor or a RADAR sensor or a plurality of RADAR sensors. Any other source of point clouds e.g., originating from depth estimation would be also applicable.

The vehicle may be a self-driving vehicle. However, a vehicle application is only one example for a general processing unit. Also, the LiDAR scanner is just an example source for point clouds. The vehicle may be a self-driving vehicle. The vehicle may be an automobile, an electric vehicle, an electric car, a van, a truck, and the like. It is also possible that the vehicle is a 3D vehicle, such as an airplane, a drone or a helicopter.

Overall, the present disclosure refers to 3D object detection in point clouds, which may originate from LiDAR or RADAR sensors, or monocular depth estimation algorithms, for instance. As an input for a data analysis within the architecture network, a high-density point cloud obtained from a LiDAR-based mobile mapping system may be utilized. The disclosed architecture improves the precision of a 3D HD map in relation to detected objects, such as traffic signs. This may improve the spatial alignment of detected objects with the input sensor data. A further advantage is a faster processing of the data compared to known systems.

BRIEF DESCRIPTION OF THE DRAWINGS

Exemplary embodiments of the present disclosure are described below with reference to the accompanying drawings, which are not necessarily drawn to scale.

The drawings illustrate.

DETAILED DESCRIPTION

Figure 1:
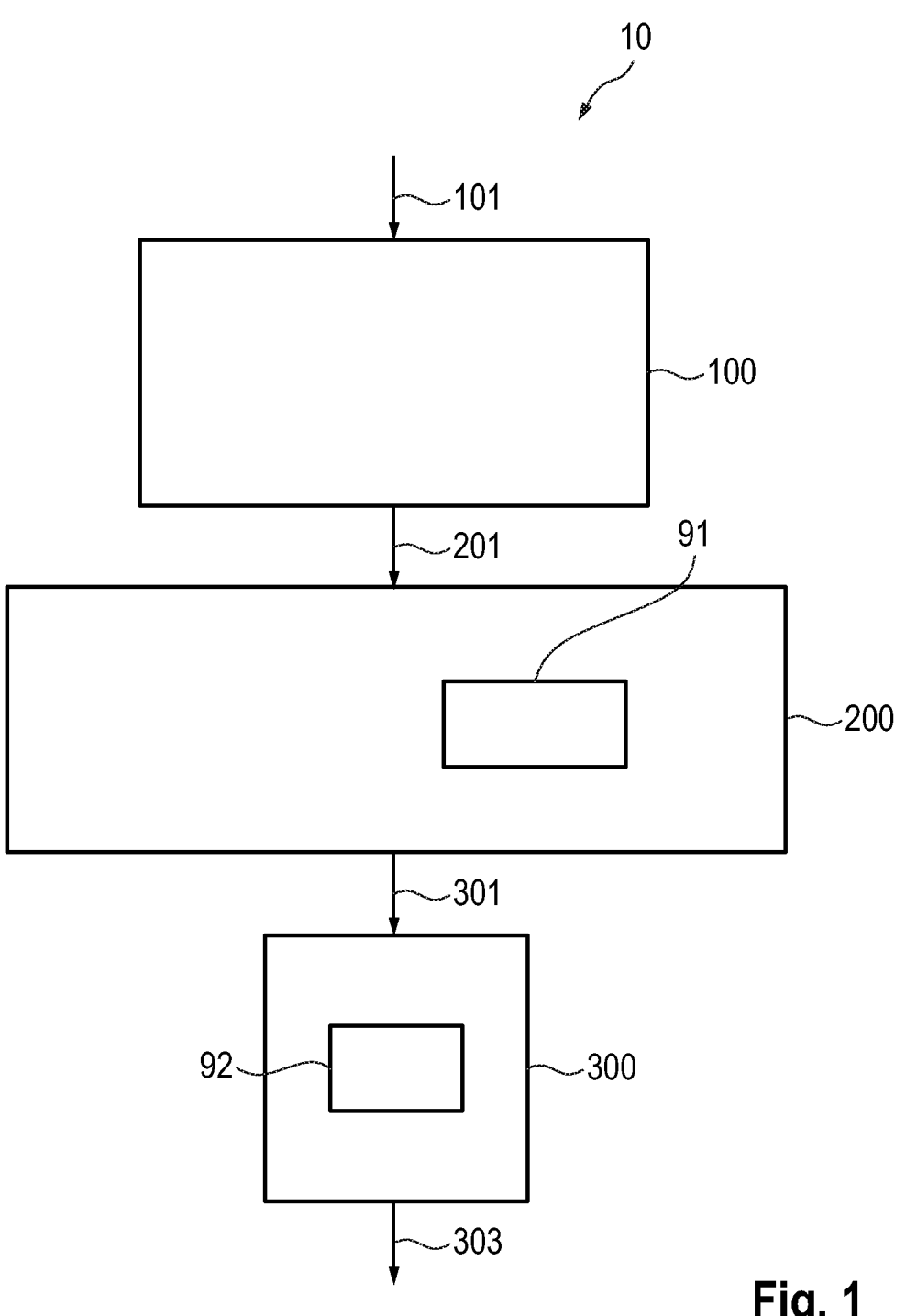
FIG. 1 shows a first network architecture according to some aspects of the present disclosure.

The exemplary embodiments explained below are preferred exemplary embodiments of the present disclosure. Furthermore, the exemplary embodiments can also be added by further features of the present disclosure and its embodiments. Elements of the same or similar function are provided with the same reference signs in the figures.

In some examples disclosed herein, the backbone and the head may be configured to process 3D data. A consequent application of 3D convolution in a 3D voxel grid through a backbone and head may be of advantage for the detection of vertically stacked objects. The projection into a 2D bird's eye view, as done by known architectures, may be a bottleneck for information regarding the vertical positioning of objects.

In this context, three-dimensional point clouds are considered. In some examples, the 2D image domain is not considered. Further, convolution in deep learning is used for extracting features for a single voxel using this respective voxel and the respective neighborhood. Such feature extraction may comprise the detection of shapes or higher semantical features.

The network architecture may be a deep neural network architecture. The vertically stacked objects may be traffic signs. The network architecture may be utilized for providing high-definition (HD) maps indicating vertical objects, especially stacked objects, such as a plurality of traffic signs mounted at different levels above ground.

According to some aspects of the present disclosure, an input of the encoder may be configured as a three-dimensional voxel grid.

In some examples, the network architecture may be utilized in a vehicle environment for detecting traffic relevant information in the surrounding of a vehicle.

In this context, a point cloud may be understood as a set of data points in three-dimensional space. The points may represent a 3D shape or object. Each point position has its set of Cartesian coordinates (x, y, z, i) and the intensity of the reflected beam (e.g., LiDAR). Point clouds are generally produced by 3D scanners such as LiDAR sensors in an automotive environment.

Sources of point clouds may originate from e.g., a vehicle's or airplanes laser scanner or radar sensor, or manually operated devices creating point clouds.

It may be advantageous that the encoder may be configurated with an augmented point cloud. Each point may provide a plurality of features (e.g., 10 features): 3D Cartesian coordinate, intensity, coordinate subtracted by the mean of all points, coordinate subtracted by the 3D center coordinate of a voxel.

According to one aspect of the present disclosure, the backbone may comprise a downstream network and an upstream network, wherein at least one component of the upstream network is connected with the at least one concatenation component, wherein the at least one concatenation is providing an output of the backbone.

According to one aspect of the present disclosure, at least one component of the down-sampling network comprises a plurality of layers, wherein each layer comprises one convolution operation, one batch normalization operation and one rectified linear unit activation.

According to one aspect of the present disclosure, an output of the encoder is configured as a three-dimensional voxel grid. Such a network architecture may be suitable for processing three-dimensional data (3D data) in the backbone, as well as in the decoder. Therefore, the backbone can be understood as a 3D backbone.

According to one aspect of the present disclosure, the backbone comprises a downstream network and an upstream network, wherein at least one component of the upstream network is connected with the at least one concatenation component, wherein the at least one concatenation is providing an output of the backbone. The output may be a 3D (spatial dimensions) grid of abstract features.

According to one aspect of the present disclosure, the head may include a detection and regression head providing at least two convolution operations in parallel. The head may be called a 3D detection and regression head, since it is adapted to process 3D data.

A detection and regression head may correspond to two convolutional operations within the head. The detection head (as part of the network head) predicts an existence likelihood that increases if an anchor is likely to contain (part of) a real-world object.

According to one aspect of the present disclosure, the method further comprises regressing bounding rectangles as a set of predefined objects, so-called anchors. Anchors may be utilized for the processing of the data in the network architecture. The regression head may predict the difference between a real-world object and an anchor that comprises (part of) the real-world object.

The present disclosure and its exemplary embodiments may be applicable to an offline generation of HD maps, or to cloud solutions for driving without map. In this case of driving without map, generating a stationary environment model on-the-fly may be utilized.

According to one aspect of the present disclosure, an input to the encoder may originate from a LiDAR point cloud and/or a RADAR point cloud.

According to one aspect of the present disclosure, the input for the encoder may originate from a LiDAR point cloud or a RADAR point cloud or any other sources of point clouds. The data of that point cloud may be provided by one or a plurality of onboard LiDAR sensors of the vehicle.

According one aspect of the present disclosure, the network architecture may be adapted for detecting vertically stacked objects in a vehicle environment. Vertically stacked objects are for example signs or traffic signs. Vertically stacked objects are for example signs or traffic signs.

According one aspect of the present disclosure, the head may comprise a detection and regression head providing at least two three-dimensional convolutions in parallel.

Parallel processing as disclosed herein has the advantage of being time efficient and fast. The two three-dimensional convolutions in parallel operating on the 3D voxel grid may be faster than processing a two-dimensional set of data and processing this data in a subsequent step for receiving three-dimensional data.

According one aspect of the present disclosure, the detection and regression head may operate in a single-shot fashion. This means that object may be predicted by the network in one single processing step.

According one aspect of the present disclosure, the detection and regression head may predict three-dimensional objects using a three-dimensional anchor grid.

In some examples, the method may be configured to discretize a point cloud of a LiDAR-sensor or RADAR-sensor, or any other source of point cloud data to obtain a 3D voxel grid with Nx, Ny, and Nz voxels (also indicated as $N^x$, $N^y$, and $N^z$) in the x-, y-, and z-dimension of the grid, collecting a number N occupied voxels with a predefined points per voxel into a second grid and providing the second grid as an input for encoding by an encoder.

According one aspect of the present disclosure, the method may further comprise utilizing a three-dimensional anchor grid for detecting three dimensional objects.

The three-dimensional objects are, for example, signs or traffic signs, lights or traffic lights, poles or obstacles. According to one aspect, it may be foreseen regressing bounding rectangles as anchors for a set of predefined objects. Further it may be foreseen adopting a bounding rectangle to match the size and position of an object, which is a real-world object.

According one aspect of the present disclosure, the method may further comprise matching ground truth poles to the anchor grid using an "intersection over smaller area" criterion including a "don't care state". The don't care state criterion will be met in case of an insufficient overlap.

According one aspect of the present disclosure, the method may further comprise training a deep neuronal network using high-density point clouds.

The method using high-density point clouds may provide a highly precise data alignment. Training the network with high-density point clouds may enable a simulation of onboard scans as well as providing robustness against heavy rain or snow. During the training and inference, the point cloud may be normalized regarding the z-dimension, e.g., by subtracting the mean z-coordinate of all ground classified points.

According one aspect of the present disclosure, the method may provide anchors for poles in the three-dimensional anchor grid with a predefined voxel size, wherein the anchors for the poles are represented as cylinders placed in the three-dimensional anchor grid with a predefined diameter.

Figure 3:
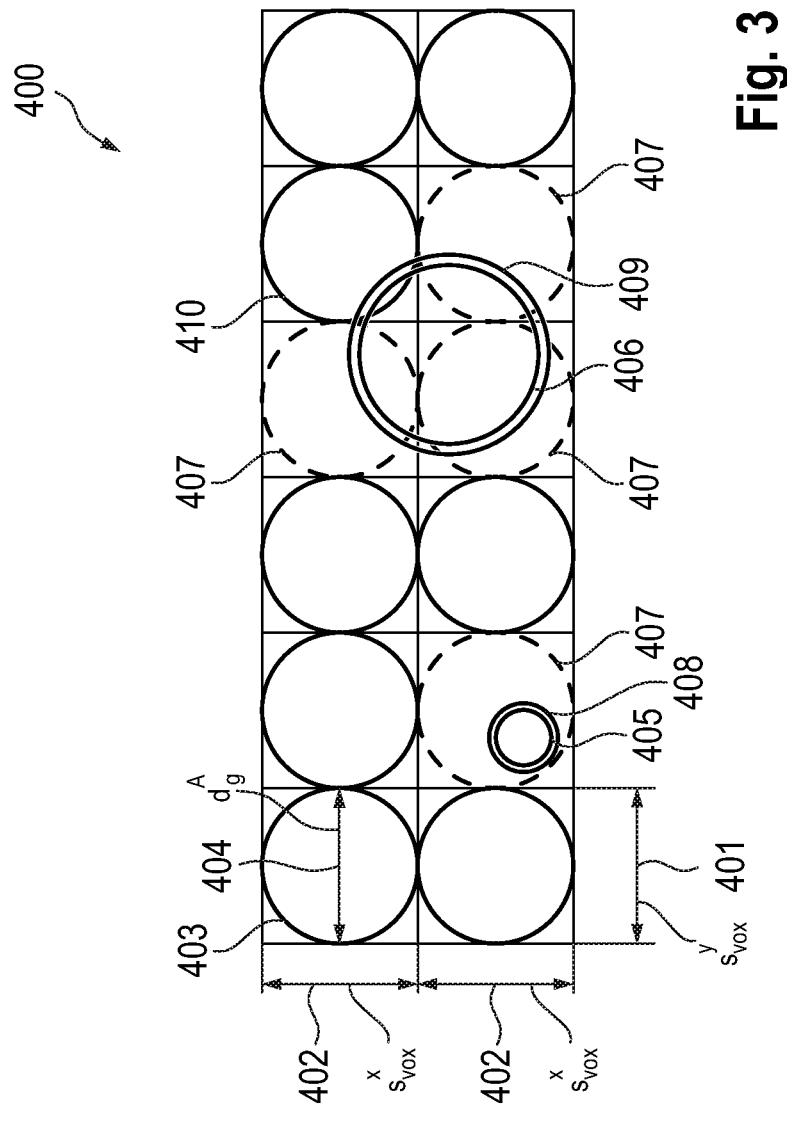
FIG. 3 a first exemplary embodiment of a design of object anchors within an anchor grid, according to some aspects of the present disclosure.

For example, an anchor design for poles may be provided wherein anchors are modeled as cylinders with for example a 20 cm diameter placed in the three-dimensional anchor grid having a voxel size of (20×20×20) cm. An exemplary embodiment of an anchor grid for poles is illustrated in FIG. 3.

According one aspect of the present disclosure, the method may provide anchors for lights in the three-dimensional anchor grid with a predefined voxel size, wherein the anchor is modeled as a squared-sized bounding box of a predefined height and a predefined width.

An anchor design for lights or traffic lights, may provide an anchor, which is modeled as a squared-sized bounding box comprising for example a height of 90 cm and a width of 30 cm, preferable as squared-sized base plate with 30 cm×30 cm. The anchors may be placed in the 3D anchor grid with voxels having a size of e.g. 40×40×40 cm. An exemplary embodiment of an anchor grid for lights is illustrated in FIG. 4, discussed in greater detail below.

According one aspect of the present disclosure, the method further comprises matching ground truth lights to the anchor grid by selecting candidates in the x-y-plane using the "intersection over smaller area" criterion, and then by filtering candidates according an overlap criterion in the z-dimension.

In some examples, the matching may be performed as a two-step strategy, whereby first matching candidates may be selected in the x-y-plane using the "intersection over smaller area" criterion (by approximating the base plate of the bounding box as circle), and then such candidates may be filtered according to the overlap in the z-dimension to obtain the final list of matching anchors. For example traffic lights can be described by a bounding box (cuboid) of for example 90 cm height and for example 30 cm squared width (being the peak of respective distributions seen in urban domains). For traffic lights, two matching criteria $K_1$ (intersection over smaller area) and $K_2$ (overlap regarding the z-dimension) may be used.

According one aspect of the present disclosure, the method may provide anchors for signs in the three-dimensional anchor grid with a predefined voxel size, wherein the anchors for the signs are represented as rectangle placed in the three-dimensional anchor grid with a predefined height and width.

Anchor design for signs, whereby a sign may be modeled as rectangle with, for example, a 65 cm height and 65 cm width. The anchors may be placed in the 3D anchor grid with voxels, e.g., of size 40×40×40 cm. The ground truth signs may be matched to the anchor grid using a two-step strategy, whereby first matching candidates are selected in the x-y-plane using a "distance to line" criterion, and then filtering candidates according to the overlap in the z-dimension. An exemplary embodiment of an anchor grid for lights is illustrated in FIG. 5. The "distance to line" (DtL) criterion is defined as the shortest distance between the line segment of the GT rectangle (defined by the edge points), and an anchor's center point.

One exemplary task that may be performed on a provided dataset is a 3D detection of traffic signs in LiDAR point clouds (LiDAR=Light Detection and Ranging). This seems to be a basic task in the field of automated driving, but has received only little attention in research, presumably due to a lack of a publicly available LiDAR dataset covering 3D traffic sign annotations. Besides map generation, traffic signs need also be detected on the fly to generate an environment model, if one aims at driving without a map or at detecting map deviations. Existing algorithms rely on handcrafted features, and additionally utilize camera images for sign detection, while the proposed deep neural network (DNN) achieves a high level of performance using LiDAR-only by learning an optimal feature representation and by incorporating context from the scene. The detection of traffic signs may be challenging as traffic signs are small and can be stacked in the vertical dimension.

The method may be utilized for detecting of vertically stacked objects in the vehicle environment, since the processed three-dimensional data may be of advantage for his kind of detection.

According to one aspect of the present disclosure, the method further comprises adopting a bounding rectangle to match the size and position of a real-world object. This adopting may be performed by the head of the architecture network.

According to one aspect of the present disclosure, the method further comprises as post-processing, e.g., filtering respective overlapping bounding rectangles by using non-maximum-suppression to obtain a final object list. Thus, the method may provide a list of objects and in this list also the classification of the object may be listed.

Turning to FIG. 1, the drawing illustrates a first network architecture 10 according to some aspects of the present disclosure. The network architecture 10 enables three-dimensional operations and comprises three processing stages with an encoder 100, a backbone 200, and a decoder with a head 300. The three stages 100, 200, 300 are connected in order to process a three-dimensional voxel grid in a vehicle environment. In the backbone 200 a convolution operation may be performed by a first convolution component 91. In the head 300, a further convolution operation may be performed by a second convolution component 92.

Figure 2:
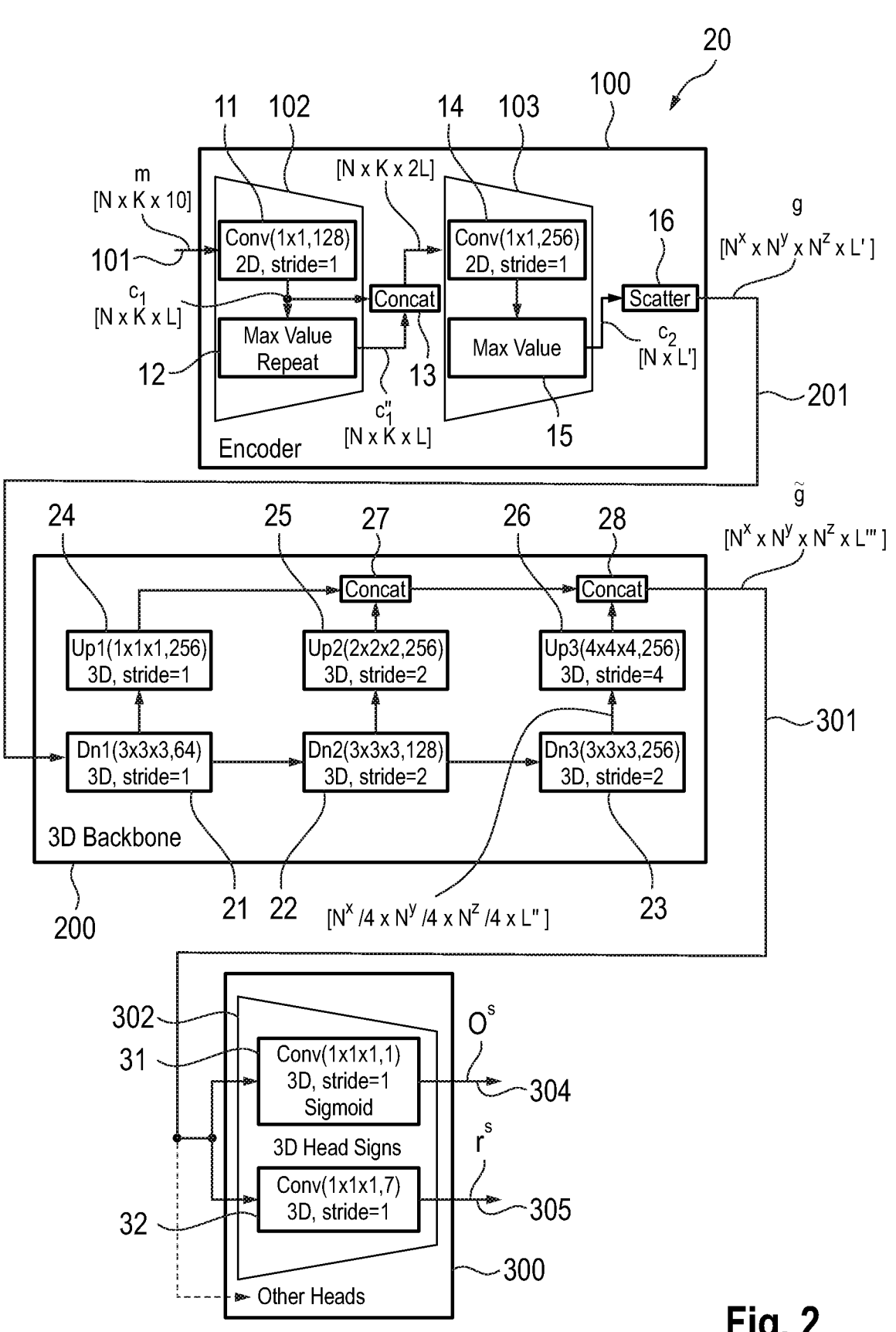
FIG. 2 a second network architecture according to some aspects of the present disclosure.

FIG. 2 illustrates a second network architecture 20 according to some aspects of the present disclosure. The network architecture 20 in this example enables three-dimensional operations and comprises three stages: an encoder 100, a backbone 200, and head 300. The three stages are connected in order to process point cloud data. In this embodiment the encoder 100 is a two-stage encoder and comprises two encoder stages 102, 103. The decoder 300 comprises one decoder stage 302.

In the example of FIG. 2, an encoder component 11 provides 2D convolution ("2D") Conv(1×1, F) with input dimension [N×K×10] uses F kernels of size 1×1×10, while a 3D convolution ("3D") Conv(1×1×1, F) with [N^x×N^y×N^z× L'"]-dimension input uses 1×1×1×L'"-sized kernels. The components "Concat" 27, 28 indicate a concatenation operation. Downsampling (Dn) blocks 21, 22, 23 comprise multiple convolution layers.

Encoder Architecture

In some examples, the encoder stage 100 learns an optimal feature representation for a point cloud. 2D convolution is provided in the encoder components 11, 14. For preparing an image processing for detecting objects, such as vertically stacked objects, a point cloud may be discretized to obtain a 3D voxel grid with $N^x$, $N^y$, and $N^z$ voxels in the x-, y-, and z-dimension of the grid. In one step, each point p is sorted into a 3D voxel grid with $N^x$, $N^y$, and $N^z$ voxels in the x-, y-, and z-dimension of the grid. Then, only the N occupied voxels with a maximum of for example K=100 points per voxel are collected into a second grid m, wherein the second grid is indicated in FIG. 2 as "m" and is a tensor. This tensor is an input 101 to the encoder 100. Furthermore, the symbols $c_1$, $c_1$", $c_2$, $\tilde{g}$ and gin FIG. 2 are indicating tensors, respectively.

Finally, the N obtained feature vectors are scattered in a scatter component 16 back to their original position in the voxel grid with zero-padding applied to empty voxels. The output g 201 of the scatter component 16 is provided to the backbone 200. Further, the symbols $O^s$ and $r^s$ in FIG. 2 indicate outputs 304, 305 of the detection and regression head 302, respectively.

Backbone Architecture

In some examples, the backbone stage 200 is a 3D backbone stage processing 3D data. The 3D backbone stage 200 receives g as the output 201 of the encoder 100. The backbone stage 200 comprises a down-stream network 21, 22, 23 and an up-stream network 24, 25, 26, utilizing 3D (transposed) convolutions in both networks on the 3D voxel grid, which allows for the individual detection individually stacked objects such as traffic signs. The down-stream network comprises three components 21, 22, 23 ("Dn" in FIG. 2), comprising 3, 5, and 5 layers, respectively. Each layer comprises one convolution, one batch normalization and one ReLU activation (ReLU=rectified linear unit). Using the up-stream network, feature maps received at different scales by the down-stream network are up-sampled to the original grid size, and are subsequently concatenated to obtain a grid of abstract features as input to the network head.

Each Dn-component 21, 22, 23 comprises multiple 3D convolution operations. An Up-block 24, 25, 26 comprises up-sampling operations (3D transposed convolution).

Up-stream blocks 24, 25, 26 are each comprising one 3D transposed convolution, followed by one batch normalization and one ReLU activation. Using the up-stream network, feature maps obtained at different scales by the down-stream network are up-sampled to the original grid size, and are subsequently concatenated. Moreover, a camera modality can be integrated. For instance, a bounding box for each individual voxel can be projected into the camera image to crop and resize respective RGB features (or abstract features. e.g., obtained by another DNN for semantic segmentation), which subsequently can be used as a voxel's feature vector.

Decoder with Detection and Regression Head

In some examples, the 3D detection and regression head of the decoder 300 may operate in a single-shot fashion. This means that the network provides object detections in one single processing stage. Within the head the network predicts existence likelihoods and regresses bounding rectangles for a set of predefined objects, so-called "anchors".

Multiple anchors can make predictions for the same real-world object. Thus, in a processing step within head 300, respective overlapping bounding rectangles are filtered using non-maximum-suppression to obtain the final object list. Thereby, only the objects with the highest existence likelihood remain. To measure the overlap, criteria for matching may be used.

Dataset and Training Procedure

In some examples, in order to train the DNN, a specialized dataset is utilized. Moreover, high-density point clouds enable the user to manipulate the point density for ablation studies, e.g., simulating different laser scanners providing different point cloud densities, or training the network to work at different point densities allowing for a robust functioning of the network also in case of heavy rain or snow. Accordingly, the proposed dataset with its accurate annotations allows further development of both 3D object detection and map deviation detection algorithms.

Examples of Applications

The network architecture may be suitable for predicting various types of HD map elements, specifically pole-like objects, traffic lights, signs, line-shaped markers and polygon-shaped markers, lanes, etc. For each element type, specific object anchors have to be designed, as well as corresponding matching strategies. Such matching strategies are necessary to match ground-truth objects to object anchors during training. Matching strategies comprise one or more association criteria, measuring the overlap of two elements of the same type, e.g., to identify matching anchors during training, to associate predicted objects with ground truth objects, and during non-maximum-suppression.

FIG. 3, FIG. 4 and FIG. 5 illustrate examples of a design of object anchors within an anchor grid of three dimensions x, y, z according to some aspects of the present disclosure. The first example of FIG. 3 refers to pole-like map elements (referred to as "poles" in this context). The second example of FIG. 4 refers to lights. The third example of FIG. 5 refers to signs. For poles, only the x-y-plane is visualized, while for lights and signs the second row visualizes the vertical z-dimension.

In FIGS. 3 to 5, three exemplary embodiments present example anchor designs for pole-like map elements (trees, traffic light poles, construction site cones and delineators, etc.), for traffic signs and for traffic lights, respectively.

Anchor Designs

In some examples, the anchor design is disclosed for poles (FIG. 3), lights (FIG. 4) and signs (FIG. 5) used to normalize the regression head outputs, respectively. The anchors are designed based on ground truth (GT) distributions for respective bounding shape parameters.

The principle of anchoring and the matching approach may also be applicable for example for pole-like objects, traffic lights, signs, line-shaped markers and polygon-shaped markers.

Subsequently, there are presented example anchor designs first for pole-like map elements (trees, traffic light poles, construction site cones and delineators, etc.), second for traffic signs, third for traffic lights.

Anchor Designs for Poles

FIG. 3 illustrates a first design of object anchors for pole-like objects within an anchor grid 400 with voxels of an x-dimension 401 and of a y-dimension 402. The grid 400 is an exemplary embodiment for an anchor design and matching strategy for pole-like objects from a bird's eye view.

In the example of FIG. 3, a cylindrical anchor 403 is chosen for pole-like objects (traffic light posts, street lamps, tree trunks, construction site cones, delineators, etc.). The regression parameters comprise the x-, y- and z-position of the base point and the diameter of the cylinder. The diameter 404 of the anchor 403 is set for example to 20 cm, which roughly corresponds to the mean value of pole-like objects in urban space (determined using a corresponding dataset). The voxel size with a first length 401 and a second length 402 of the grid 400 is also set to this value. During the training of the neural network, real-world objects 405, 406 have to be matched onto the anchor grid 400 in order to generate the so-called training targets, which the network should output.

Regarding the pole diameter distribution, no peak can be identified. Thus, the mean of all diameters may be utilized as anchor size, which yields $$d_g^A = 20 \text{ cm.}$$

A real-world object 405, 406 can be associated with several object anchors 407. Associated object anchors are then scaled to the size of the associated real-world object. The associated scaled object anchors 408, 409, which are shown slightly enlarged around the corresponding real-world object 405, 406. The association criteria described are used for the matching strategies.

Accordingly, the target value for the existence probability is 1 in this example. In addition, the regression parameters for the object anchor are set to correspond to the real-world object. In this case, a normalization is carried out so that the neural network only has to predict the offsets between predefined object anchors and the real-world object.

Here $$s_{vox}^x \text{ and } s_{vox}^y$$

(reference signs 402, 403) corresponds to the voxel size of the anchor grid (e.g. 20 cm in each dimension x and y) and d (reference sign 404) is the diameter of the object. The subscript g indicates a voxel. The superscript A denotes an object anchor.

Anchor Designs for Lights

Figures 4A, 4B:
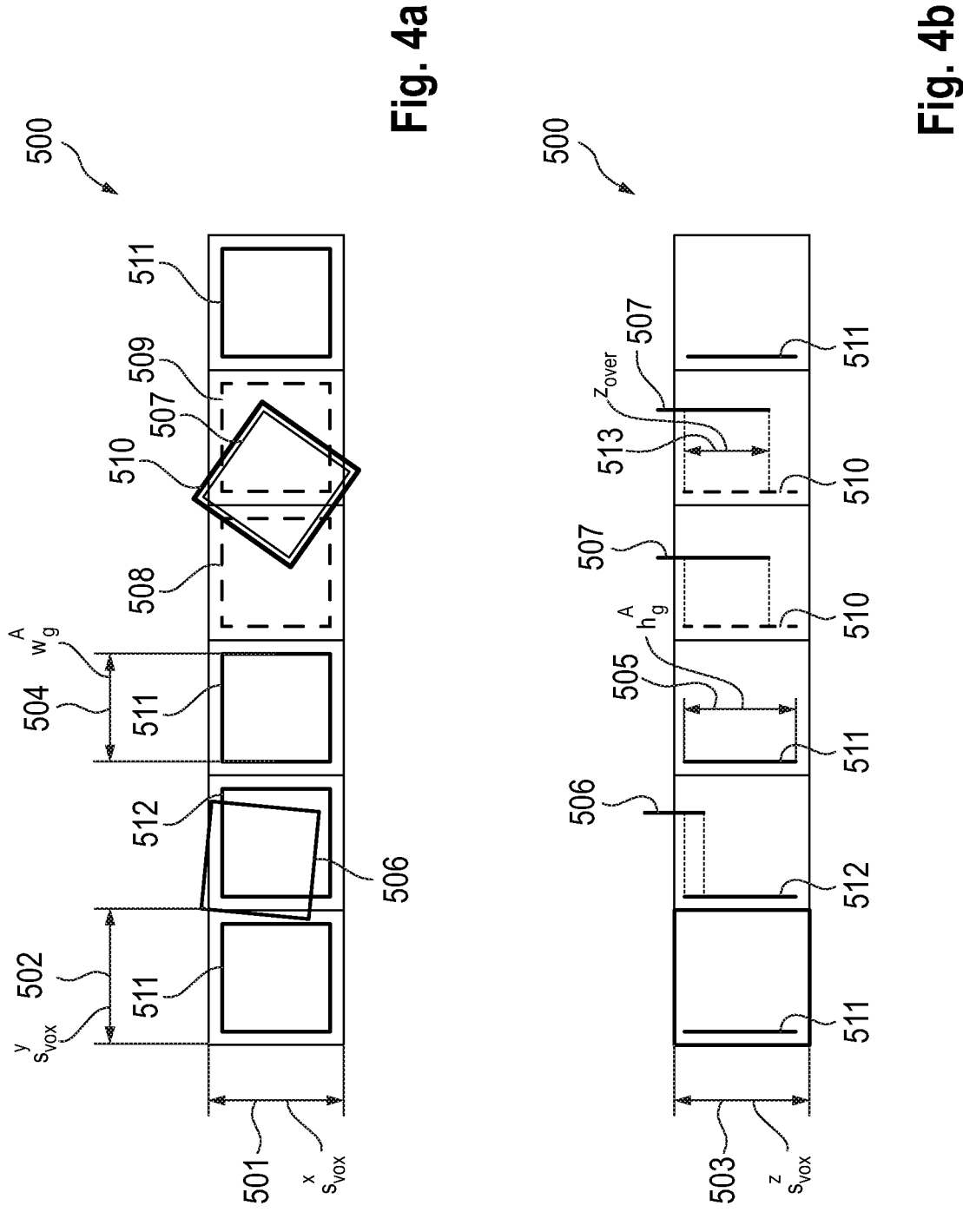
FIG. 4 a second exemplary embodiment of a design of object anchors within an anchor grid, according to some aspects of the present disclosure.

FIG. 4 illustrates a second design of object anchors for lights or traffic lights within an anchor grid 500 with voxels of an x-dimension 501, of a y-dimension 502 (FIG. 4*a*) and of a z-dimension 503 (FIG. 4*b*) according to some aspects of the present disclosure.

In the example of FIG. 4, a squared-sized anchor 511 is chosen for light objects. For traffic lights, the distribution for bounding box height h and width w of the (square-sized) base plate may peak around w=30 cm, with three peaks occurring at h=30 cm, h=60 cm, and h=90 cm, due to the varying number of stacked lights in traffic light boxes. As only single-sized anchors may be applied, we select the highest peak h=90 cm, which yields in $$504, \ w_g^A = 30 \text{ cm and in } 505, \ h_g^A = 90 \text{ cm}$$

used as anchor size.

Anchor Designs for Signs

Figures 5A, 5B:
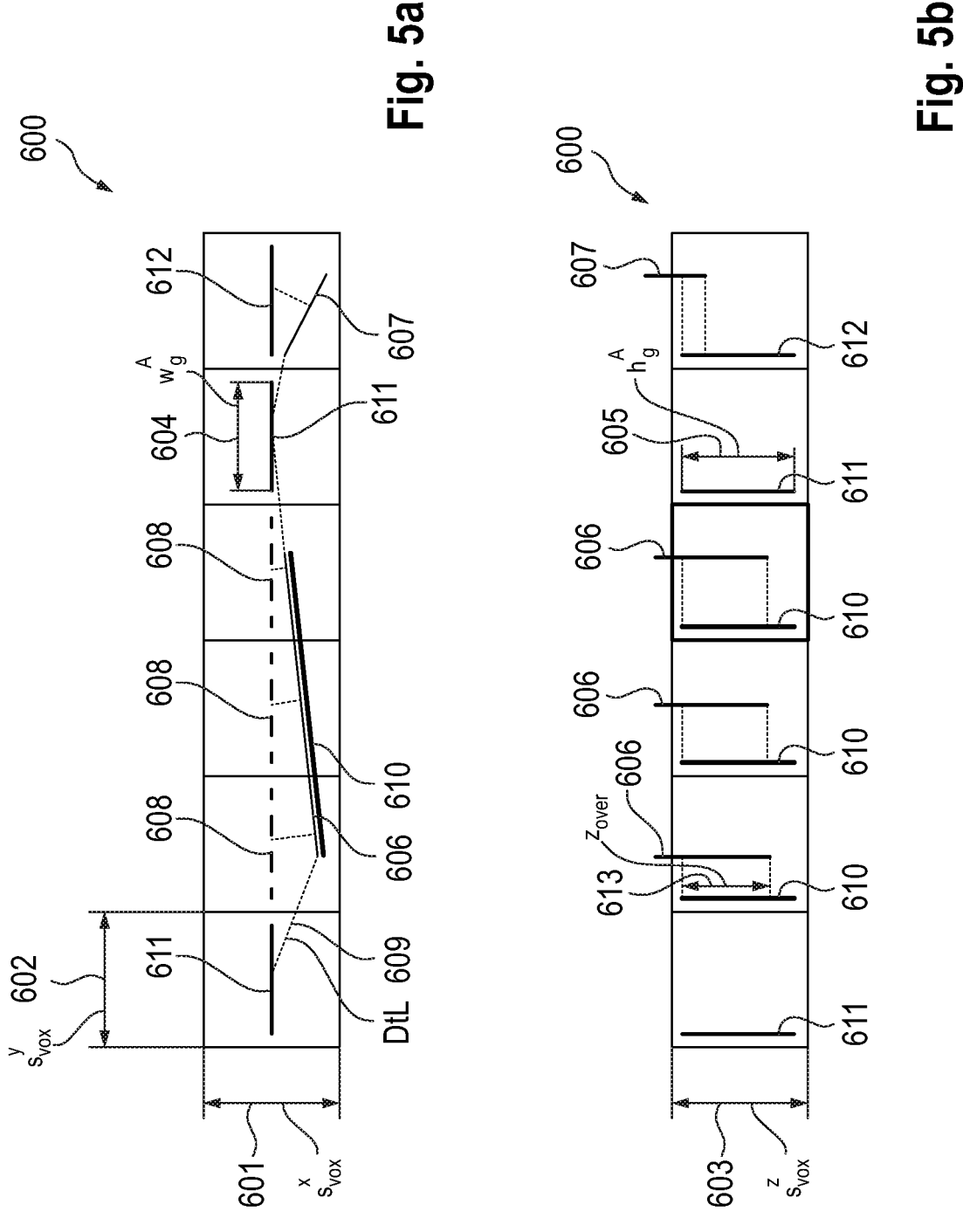
FIG. 5. a third exemplary embodiment of a design of object anchors within an anchor grid, according to some aspects of the present disclosure.

FIG. 5 illustrates a third design of object anchors for signs within an anchor grid 600 with voxels of an x-dimension 601, of a y-dimension 602 (FIG. 5*a*) and of a z-dimension 603 (FIG. 5*b*), according to some aspects of the present disclosure.

In the example of FIG. 5, a rectangle shape is chosen as an anchor 611 for signs (visualized as line from a bird's eye view). Regarding traffic signs, the ground truth distribution for bounding rectangle height and width features may peak around h=65 cm and width w=65 cm which is used as default anchor size. Moreover, most signs are sized above 40 cm. Hence, $$s_{vox}^x = s_{vox}^y = s_{vox}^z = 40 \text{ cm}$$

(reference signs 601, 602, 603) is used as voxel size for the anchor grid. Most signs may have a height above ground z<6 m, which is covered by the z-extent of point cloud crops used as network input.

Matching Strategies, Association Metrics and Criteria

During training, GT objects are matched to the anchor grid to provide the targets for the respective network outputs. To this end, element-type-specific matching strategies (being procedures) may be used, and visualized in FIGS. 3 to 5, as well as association metrics that measure the overlap of anchors and GT objects. Also, association criteria may be defined as thresholds for respective metrics that have to be met for a successful association.

In general, a single GT element can potentially match with multiple anchors. If an anchor contained in voxel g matches with the GT element, we set the anchor's object detection target to 1 (being the target existence likelihood). The anchor's regression target is set to match the size and position of the GT object using respective ground truth shape parameters.

On the other hand, in case of a mismatch, both the detection and the regression target may be set to zero. For all elements, to ensure that a GT element is matched with at least one anchor, we consider the anchor with the closest Euclidean distance to the GT element as match, independently from further association criteria.

Matching anchors (in FIG. 3: 407; in FIG. 4: 508, 509; in FIG. 5: 606) have their target anchor offsets set to match the ground truth object's bounding shape parameters (in FIG. 3: 409; in FIG. 4: 510; in FIG. 5: 610). Anchors with a "don't care state" (in FIG. 3: 410; in FIG. 4: 512; in FIG. 5: 612) feature an insufficient overlap regarding at least one association metric.

Matching Strategy for Poles

To measure the overlap with anchors surrounding the ground truth element, an "intersection over smaller area" (IosA) association metric is defined as the intersecting area of the two circles in the x-y-plane (given by a respective anchor and the ground truth cylinder diameter), indicated relative to the smaller of both circle areas.

Criterion $K_1$ for poles is, for example: Intersection over smaller Area (IosA)–Intersection of both circular areas. If the formulated criterion $K_1$ ("IosA criterion") exceeds a threshold value (e.g. 0.2), the object anchor is considered as match.

IosA>0.2 may be used as association criterion for surrounding anchors to be considered as matches (see the three dashed matching anchors 407 in FIG. 3). Otherwise, if IosA=0, the respective anchor is considered as mismatch. Moreover, for anchors featuring an insufficient overlap with the GT element with 0<IosA≤0.2, a "don't care" state (see 410 of FIG. 3) is allowed during training, in which an anchor is not considered for loss computation. For element comparison and performance evaluation, the Euclidean distance $d_E$ may be solely relied upon as an association metric, which may be more robust than the additional usage of IosA. For both comparison and evaluation, we require $d_E$=0.3 m as criterion for a successful association.

In this example a "don't care state" is used if 0<IosA≤0.2 (see cycle 410). This condition has the consequence that the object (here cycle 410) is ignored during the calculation of a loss function because it cannot be sufficiently classified as match. Therefore, object anchors with IosA=0 do not contain any object, so within the evaluation the target existence likelihood value is set to 0, accordingly.

Matching Strategy for Lights

In some examples, traffic lights can be described by a bounding box (cuboid), for example, of 90 cm height and 30 cm squared width (being the peak of respective distributions seen in urban domains). For traffic lights two matching criteria $K_1$ and $K_2$ may used.

Criterion $K_1$ for traffic lights is for example: Intersection over Union (IoU) to determine the overlap of two bounding boxes in the x-y-plane (two squares in bird's eye view). Alternatively: simplify the calculation by approximating the squares as circles to allow for the application of IosA, or simply the association using a Euclidean distance metric.

In some examples, criterion $K_2$ for traffic lights may be configured as follows: Overlap in the z-dimension measured as the overlap of two linear lines (determined by $z_{min}$ and $z_{max}$): ratio of the length of the overlap to the length of the smaller line.

For the evaluation of traffic lights with the method of the anchor principle firstly, potential anchors are selected as matching candidates in the x-y-plane (with z as the vertical dimension). For this purpose, the cuboid may be approximated as a cylinder (the cylinder diameter corresponds to the width of the cuboid) in order to apply the criterion $K_1$ in the same way as for poles.

Subsequently, the matching candidates are further filtered based on the overlap in the vertical z-dimension using the criterion $K_2$ to obtain the final amount of power. The don't-care state is only determined using the criterion $K_2$ (z-overlap Z over), e.g. $0.1<z_{over}≤0.2$. Matching candidates are considered as final match if $z_{over}>0.2$.

Matching Strategy for Signs

In some examples, two matching criteria are used for traffic signs (described by a rectangle). As with the traffic lights, a two-stage procedure is used. First, matching candidates are determined in the x-y-plane using a criterion $K_1$ "distance to line" 609 (DtL), whereby the shortest distance been an anchor center point and the bottom line of the GT object's bounding rectangle in the x-y-plane is determined. For a matching candidate, DtL<10 cm may be required. Matching candidates are then further filtered using the vertical overlap $K_2$. Here, too, the don't-care state is also only defined via the criterion $K_2$, e.g., $0.1<z_{over}≤0.2$.

Further Objects

The anchor principle may also be applicable for (linear) lanes and (linear) lane markings, curbs, fences, or other linear shaped map elements. Here, one criterion may be used, whereby both elements to be associated are described using support points. Support points are first associated between both elements using the smallest Euclidean distance between points. $K_1$ as the averaged Euclidean distances may then be $K_1$<20 cm for a successful association.

For polygon markings, one criterion $K_1$ as intersection over union (IoU) may be used, whereby the overlap of two polygons is being measured.

The 3D backbone, head, and anchor grid applied in the proposed network architecture provide improvements regarding the detection of vertically stacked signs, as the vertical dimension is also used for convolution. The architecture of FIG. 1 and FIG. 2 is also capable of resolving respective sign clusters. The positional information of signs is largely encoded by the spatial position of voxels in the grid, rather than in a voxel's feature vector, which can seemingly only encode small positional offsets. The proposed network architecture omits a "middle extractor" as known from other architectures and uses 3D convolutions consequently throughout the backbone and network heads.

Overall, the network provides object predictions. An HD map may be utilized as a dataset to train the network. The network then detects HD map elements, e.g., to generate an HD map, or to detect various map elements as part of the stationary environment model of the vehicle.

The methods disclosed herein are able to provide 3D object predictions regarding various types of HD map elements, such signs, lights, poles, markings, lanes, construction site elements (e.g., fences or cones), lanes, etc. Such predictions include 3D positions and bounding shapes for all element types.

The network architecture can be extended to operate in a multi-task fashion. To this end, multiple network heads predicting each a different map element type can be attached to the backbone.

The methods disclosed herein may also be able to provide 3D object predictions regarding all three spatial dimensions of the point clouds for signs, poles, curbs, and construction site elements, such as delineators or fences. Such predictions include 3D positions and bounding polygons for all element types. Moreover, the map elements feature a precise alignment with the high-density point clouds, as these may be used to generate (part of) an HD map, for instance.

Overall, a network architecture, especially a deep neural network architecture, is disclosed, which enables the individual detection of objects, in particular vertically stacked objects.

A deep neural network is also disclosed for sign detection trained in an end-to-end fashion, omitting the need for hand-crafted feature design, clustering algorithms, or plane fitting. Moreover, the suggested method is suitable for both high-density and sparse point clouds, originating either from LiDAR or RADAR, or other sources.

The various embodiments disclosed herein are also suitable for the preservation of information related to the vertical dimension of points when encoding a point cloud. Further, the methods may be utilized for performing traffic sign detection directly in LiDAR point clouds using a deep neural network.

REFERENCE SIGNS 10, 20 network architecture
11, 14 2D convolution component
12 max value repeater performing maximum and repeat operation
13, 27, 28 concatenation component
15 max value
16 scatter
21, 22, 23 component of a downstream network, e.g. 3D component
24, 25, 26 component of an upstream network, e.g. 3D component
31, 32 convolution component, e.g. 3D component
91, 92 convolution component, e.g. 3D component
100 encoder stage
101 input
102, 103 encoder
200 backbone stage
201 input
300 decoder stage
301 output of backbone as well as input to detection and regression head
302 decoder with detection and regression head
303, 304, 305 output
400 anchor grid
401 voxel in x-dimension
402 voxel in y-dimension
403 cylindrical anchor
404 diameter
405, 406 real-world object or object
407 object anchor
408, 409 scaled object anchor (overlapping)
410 anchor with "don't care state"
500 anchor grid
501 voxel in x-dimension
502 voxel in y-dimension
503 voxel in z-dimension
504 width
505 height
506, 507 real-world object or object
508, 509 matching object anchor
510 scaled object anchor (overlapping)
511 unmatching anchor
512 anchor with "don't care state"
513 association criteria $z_{over}$
600 anchor grid
601 voxel in x-dimension
602 voxel in y-dimension
603 voxel in z-dimension
604 width
605 height
606, 607 real-world object or object
609 association criteria "distance to line" (DtL)
608 matching anchor
610 scaled object anchor
611 unmatching anchor
612 anchor with "don't care "state"
613 association criteria $z_{over}$

The invention claimed is:

1. A point-cloud processing system for three-dimensional object detection in a point cloud comprising:
   an encoder;
   a backbone; and
   a head, wherein the encoder, the backbone, and the head are implemented by one or more processors, and wherein the backbone and/or the head are configured with a three-dimensional convolution component for processing three-dimensional data of the point cloud stored in memory within a three-dimensional voxel grid to detect vertically stacked objects in a vehicle environment and output a plurality of three-dimensional object detections comprising three-dimensional positions of the vertically stacked objects in the point cloud,
   wherein the plurality of three-dimensional object detections comprise respective three-dimensional positions of at least a first object and a second object that are vertically stacked relative to one another.

2. The point-cloud processing system according to the claim 1, wherein an input to the encoder comprises data from a LiDAR point cloud and/or a RADAR point cloud.

3. The point-cloud processing system according to the claim 1, wherein the head comprises a detection and regression head providing at least two three-dimensional convolutions in parallel.

4. The point-cloud processing system according to the claim 3, wherein the detection and regression head is configured to operate in a single-shot fashion.

5. The point-cloud processing system according to the claim 3, wherein the detection and regression head is configured to detect three-dimensional objects using a three-dimensional anchor grid.

6. The point-cloud processing system according to claim 5, wherein the detection and regression head is configured to match ground truth poles to the anchor grid using an intersection-over-smaller-area criterion that includes a "don't care" state.

7. The point-cloud processing system according to claim 5, wherein the three-dimensional anchor grid comprises anchors for poles with a predefined voxel size, wherein the anchors for the poles are represented as cylinders placed in the three-dimensional anchor grid with a predefined diameter.

8. The point-cloud processing system according to claim 5, wherein the three-dimensional anchor grid comprises anchors for lights with a predefined voxel size, wherein the anchors are modeled as a squared-sized bounding box of a predefined height and a predefined width.

9. The point-cloud processing system according to claim 8, wherein the detection and regression head is configured to match ground truth lights to the anchor grid by selecting candidates in an x-y-plane using an intersection-over-smaller-area criterion, and filtering candidates according an overlap criterion in the z-dimension.

10. The point-cloud processing system according to claim 5, wherein the three-dimensional anchor grid comprises anchors for signs with a predefined voxel size, and wherein the anchors for the signs are represented as rectangles placed in the three-dimensional anchor grid with a predefined height and width.

11. The point-cloud processing system according to claim 1, wherein the point cloud comprises a high-density point cloud, and wherein the point-cloud processing system comprises a neural network trained using high-density point clouds.

12. A method for detecting three-dimensional objects, comprising:

receiving a point cloud input in an encoder;

performing, in one or more of a backbone and/or head, a three-dimensional convolution by processing three-dimensional data of the point cloud within a three-dimensional voxel grid, wherein the receiving and the performing are executed by one or more processors, and the three-dimensional voxel grid is stored in memory; and outputting three-dimensional object detections comprising three-dimensional positions of the vertically stacked objects in the point cloud, wherein the three-dimensional object detections comprise respective three-dimensional positions of at least a first object and a second object that are vertically stacked relative to one another.

13. The method according to claim 12, wherein the detecting of the three-dimensional objects comprises detecting of the three-dimensional objects using a three-dimensional anchor grid.

14. The method according to claim 13, further comprising matching ground truth poles to the anchor grid using an intersection-over-smaller-area criterion that includes a "don't care" state.

15. The method according to claim 13, wherein the three-dimensional anchor grid comprises anchors for poles with a predefined voxel size, wherein the anchors for the poles are represented as cylinders placed in the three-dimensional anchor grid with a predefined diameter.

16. The method according to claim 13, wherein the three-dimensional anchor grid comprises anchors for lights with a predefined voxel size, wherein the anchors are modeled as a squared-sized bounding box of a predefined height and a predefined width.

17. The method according to claim 13, further comprising matching ground truth lights to the anchor grid by selecting candidates in an x-y-plane using an intersection-over-smaller-area criterion, and filtering candidates according an overlap criterion in the z-dimension.

18. The method according to claim 13, wherein the three-dimensional anchor grid comprises anchors for signs with a predefined voxel size, and wherein the anchors for the signs are represented as rectangles placed in the three-dimensional anchor grid with a predefined height and width.

19. The method according to claim 12, wherein the point cloud comprises a high-density point cloud, and wherein the method is performed using a neural network trained using high-density point clouds.

20. A vehicle for a three-dimensional object detection, comprising:

one or more LiDAR-sensor and/or one or more RADAR sensors for providing one or more outputs;

an encoder configured to receive the one or more outputs to generate a point cloud;

a backbone; and a head, wherein the backbone and/or the head are configured with a three-dimensional convolution component for processing three-dimensional data of the point cloud within a three-dimensional voxel grid to detect vertically stacked objects in a vehicle environment and output a plurality of three-dimensional object detections comprising respective three-dimensional positions of the vertically stacked objects in the point cloud, and provide the three-dimensional object detections to a vehicle control system comprising at least one of a motion planning system, a localization system, and a mapping system, wherein the plurality of three-dimensional object detections comprise respective three-dimensional positions of at least a first object and a second object that are vertically stacked relative to one another.

* * * * *